(12) United States Patent
Finn et al.

(10) Patent No.: US 8,622,424 B2
(45) Date of Patent: Jan. 7, 2014

(54) MOTOR VEHICLE SAFETY DEVICE

(75) Inventors: Hugh Finn, Cheshire (GB); Gary Wootton, Staffordshire (GB)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 13/809,755

(22) PCT Filed: Jul. 12, 2011

(86) PCT No.: PCT/EP2011/003463
§ 371 (c)(1),
(2), (4) Date: Jan. 11, 2013

(87) PCT Pub. No.: WO2012/031643
PCT Pub. Date: Mar. 15, 2012

(65) Prior Publication Data
US 2013/0113195 A1    May 9, 2013

(30) Foreign Application Priority Data

Jul. 16, 2010  (EP) .................................... 10251282

(51) Int. Cl.
*B60R 21/2338*  (2011.01)
*B29C 70/06*  (2006.01)
*D02G 3/04*  (2006.01)

(52) U.S. Cl.
USPC ....... 280/743.2; 280/743.1; 57/210; 442/199; 428/36.3; 428/365; 428/375

(58) Field of Classification Search
USPC ........... 280/730.2, 743.1, 743.2; 57/210, 224, 57/903, 905; 442/199, 203, 208; 428/36.3, 428/36.91, 357, 364, 365, 368, 370, 371, 428/374–378, 401, 403
See application file for complete search history.

(56) References Cited

U.S. PATENT DOCUMENTS 5,344,710 A * 9/1994 Jacob et al. .................... 428/370
5,735,110 A * 4/1998 Kruger et al. .................. 57/224
5,768,875 A   6/1998 Bergen (Continued)

FOREIGN PATENT DOCUMENTS

WO    WO 90/09295    8/1990

OTHER PUBLICATIONS

PCT International Search Report—Oct. 13, 2011.
German Examination Report—Dec. 19, 2011.

*Primary Examiner* — Paul N Dickson
*Assistant Examiner* — Darlene P Condra
(74) *Attorney, Agent, or Firm* — Brinks Gilson & Lione

(57) ABSTRACT

There is disclosed a safety device for a motor vehicle. The device comprises an inflatable (6) element formed from two opposing layers of fabric (10, 11) and the two layers of fabric are interconnected by a plurality of tether yarns (18) extending between said layers. Each said tether yarn (18) is a composite yarn comprising an outer thread (21) and a core thread (20), with the outer thread (21) being overfed on the core thread (20) and having a higher breaking strength than the core thread (23). The device is preferably configured such that the core threads (20) of the tether yarns (18) break (23) upon inflation of said inflatable element (6), thereby permitting the outer thread (21) to unravel and extend the effective length of the tether yarns (18) between said layers.

15 Claims, 4 Drawing Sheets

(56) References Cited

U.S. PATENT DOCUMENTS

| | | |
|---|---|---|
| 5,997,037 A | 12/1999 | Hill et al. |
| 6,296,276 B1 | 10/2001 | Ritter |
| 6,457,745 B1* | 10/2002 | Heigl .................. 280/743.2 |
| 6,489,006 B1* | 12/2002 | Keshavaraj ............ 428/125 |
| 6,712,389 B2* | 3/2004 | Mauleon ............... 280/743.2 |
| 2003/0074879 A1* | 4/2003 | Patrick ..................... 57/229 |
| 2005/0098995 A1* | 5/2005 | Fischer ................. 280/743.2 |
| 2005/0253367 A1* | 11/2005 | Heigl ................... 280/730.2 |
| 2006/0192373 A1* | 8/2006 | Manley ................. 280/743.1 |
| 2007/0040368 A1 | 2/2007 | Manley |
| 2007/0200329 A1 | 8/2007 | Ma |
| 2008/0042413 A1* | 2/2008 | Coleman et al. ....... 280/743.1 |
| 2009/0124149 A1* | 5/2009 | Barnes et al. ............. 442/59 |
| 2009/0224521 A1* | 9/2009 | Huber .................. 280/743.1 |
| 2011/0140401 A1* | 6/2011 | Fischer et al. ......... 280/743.1 |

* cited by examiner

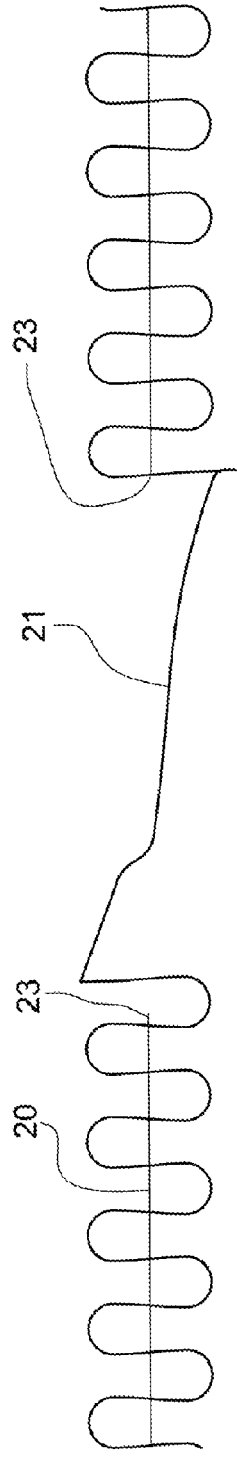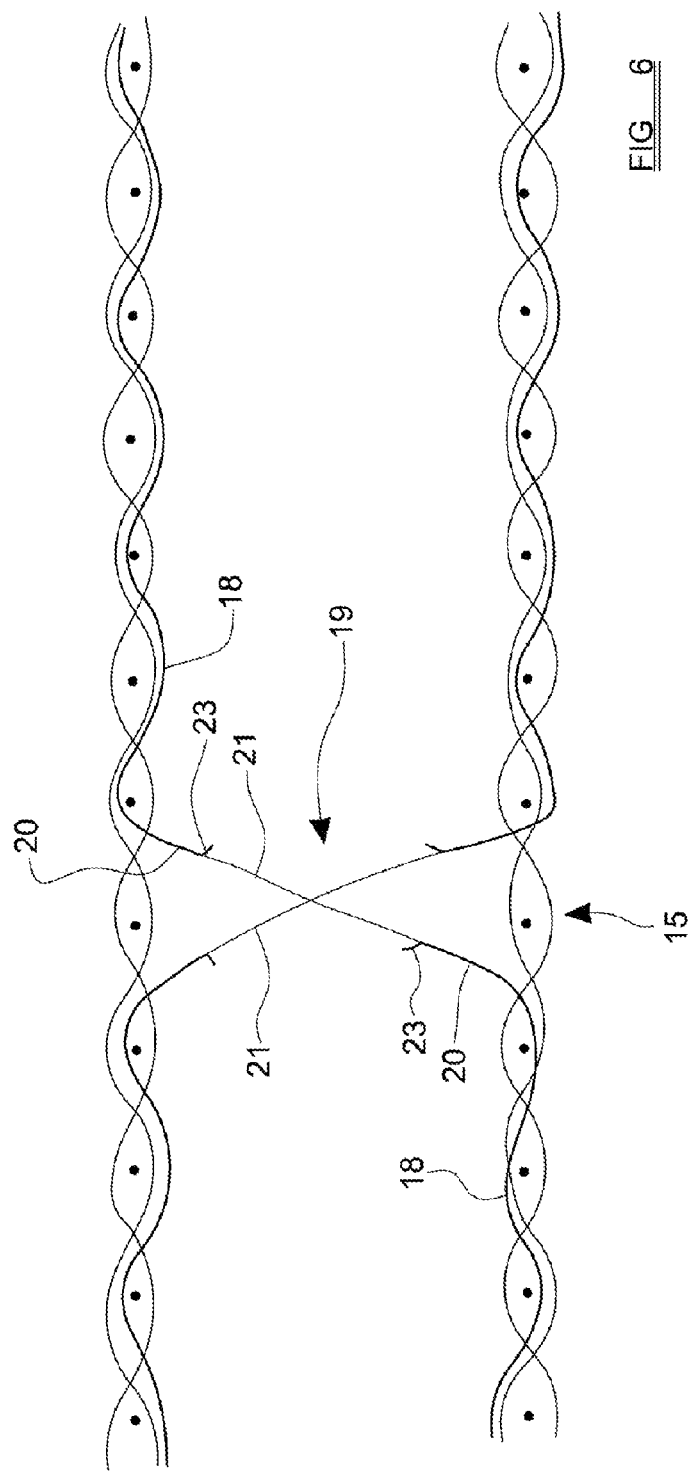

MOTOR VEHICLE SAFETY DEVICE

CROSS-REFERENCE TO RELATED APPLICATIONS

This application claims priority to European Patent Application No. 10251282.9, filed Jul. 16, 2010 and PCT/US2011/003463, filed Jul. 12, 2011.

The present invention relates to a safety device, and more particularly a safety device in the form of an inflatable element provided in a motor vehicle such as a passenger car in order to afford protection for an occupant of the vehicle.

BACKGROUND OF THE INVENTION

It has previously been proposed to provide an inflatable element or air bag in a motor vehicle in a position such that in the event of an accident involving a side impact or a roll-over incident, the inflated element is inflated so as to become disposed between the side of the vehicle and the head of a vehicle occupant in order to protect against the occupant's head coming into contact with or passing through a window in the side of the vehicle. Inflatable elements of this type are generally known as "inflatable curtains" or "side curtain airbags".

It has been proposed to divide the inflatable element into a plurality of interconnected "cells" by forming the element from two woven layers of fabric with selected regions of the two fabric layers being woven together by a so-called one-piece weaving technique in order to interconnect the two layers and thereby define the periphery of each of the cells. The interwoven regions which define the periphery of each of the cells may be relatively large, thereby reducing the overall volume of the inflatable cells and the volume of gas which is required to inflate the element such that the element may be inflated more quickly. Dividing these inflatable elements into a plurality of cells prevents the element from "ballooning" when inflated, thereby enabling the inflated shape of the element to be controlled.

However, dividing the inflatable element into a plurality of cells by weaving together the two layers of fabric which form the element in selected regions also has certain disadvantages. It is not as easy to control the inflation of a large number of small cells as it is to control the inflation of one or two larger chambers. Thus, whilst the volume of gas required to inflate the element may be reduced, the regions where the two layers of fabric are woven together present obstructions to the natural flow of inflation gas into the inflatable element during inflation and these interwoven regions may therefore impede the inflating flow of gas and result in the element inflating in a manner which is not exactly as desired.

In order to address these problems it has therefore been proposed to prevent ballooning and to control the inflated shape of such inflatable elements by means other than dividing them into cells by a one-piece weaving technique. One such proposal is to use a so-called "tether weave" to provide a number of discrete tethers between the two opposed layers of fabric defining the inflatable element. An arrangement of this type is proposed in U.S. Pat. No. 6,296,276 in which internal tethers are defined within the inflatable element by threads which form an integral part of the weave of the fabric layers. Such a tether is defined by threads which depart from the weave of one of the two layers of fabric and extend towards and into the weave of the other layer of fabric at discrete points. The resulting inflatable element has a more open internal structure than the one-piece-woven multiple-cell type, with the threads serving as tethers between the two layers of fabric to prevent ballooning but without representing significant obstacles to the flow of inflating gas. However, it has been found that conventional "tether weave" arrangements of the type described above have their own problems. One such problem is that as the two fabric layers move apart from one another during inflation of the inflatable element, the threads defining the tethers are pulled through the weave of the two layers, thereby causing the inflatable element to contract in a longitudinal direction compared to its flat uninflected condition. In the case of a typical inflatable curtain arrangement, this contraction can be of the order of 25% of the uninflated length of the curtain. This is a problem which is more significant for tether weave arrangements than one-piece woven arrangements. For example, a conventional inflatable curtain of a one-piece woven construction for a motor car might contract in length by approximately 96 mm as it inflates, whereas a comparable curtain of conventional tether weave construction can contract by as much as 135 mm. As will be appreciated, this can significantly affect the coverage of the inflated curtain and hence its effectiveness.

The present invention seeks to provide an improved safety device of the type described above.

SUMMARY OF THE INVENTION

According to a first aspect of the present invention there is provided a safety device for a motor vehicle, the device comprising an inflatable element formed from two opposing layers of fabric, the two layers of fabric being interconnected by a plurality of tether yarns extending between said layers within the inflatable element, wherein each said tether yarn is a composite yarn comprising an outer thread and a core thread, the outer thread being overfed on the core thread and having a higher breaking strength than the core thread.

Preferably, said tether yarns are configured such that their outer threads remain substantially intact but their core threads break upon inflation of said inflatable element, thereby permitting the outer threads to unravel and thus extend the effective length of the tether yarns between said layers.

Advantageously, the outer thread of each tether yarn is provided over the core thread with an overfeed of at least 10%

Conveniently, the outer thread of each tether yarn is provided over the core thread with an overfeed of approximately 15%.

Preferably, the outer thread of each tether yarn is twisted over and around the core thread.

Advantageously, the outer thread of each tether yarn has a linear mass density at least 4 times that of the core thread.

Conveniently, the core thread of each tether yarn has a linear mass density in the range 80-110 detx.

Preferably, the outer thread of each tether yarn has a linear mass density in the range 450-1100 detx.

Advantageously, the outer thread of each tether yarn has a linear mass density of approximately 470 detx.

Conveniently, said tether yarns are grouped together so as to collectively define at least one tether interconnecting said layers of fabric at a predetermined position and disposed internally within the inflatable element. The tether may represent a loose collection of tether yarns rather than tightly bound or woven tether yarns.

Advantageously, the safety device comprises a plurality of said tethers arranged to interconnect said layers of fabric at respective and discrete positions.

Preferably, said tether yarns are each woven into the weave of at least one said layer.

Advantageously, said tether yarns are woven into both layers of fabric.

Conveniently, said tether yarns have a different construction from the warp and weft yarns from which said layers of fabric are predominantly woven.

Preferably, said tether yarns are the only composite yarns.

According to another aspect of the present invention, there is provided a safety device of the type defined above, provided in a motor vehicle such that the inflatable element is configured to be disposed between an occupant of the vehicle and the side of the vehicle when inflated to afford protection in the event of a side impact or roll-over incident.

BRIEF DESCRIPTION OF THE DRAWINGS

So that the invention may be more readily understood, and so that further features thereof may be appreciated, embodiments of the invention will now be described by way of example with reference to the accompanying drawings in which:

FIG. 5 is a schematic representation of the composite tether yarn in a second condition; and FIG. 6 is view corresponding generally to that of FIG. 3, but showing the inflatable element in an inflated condition after deployment.

DETAILED DESCRIPTION OF THE DRAWINGS

Figure 1:
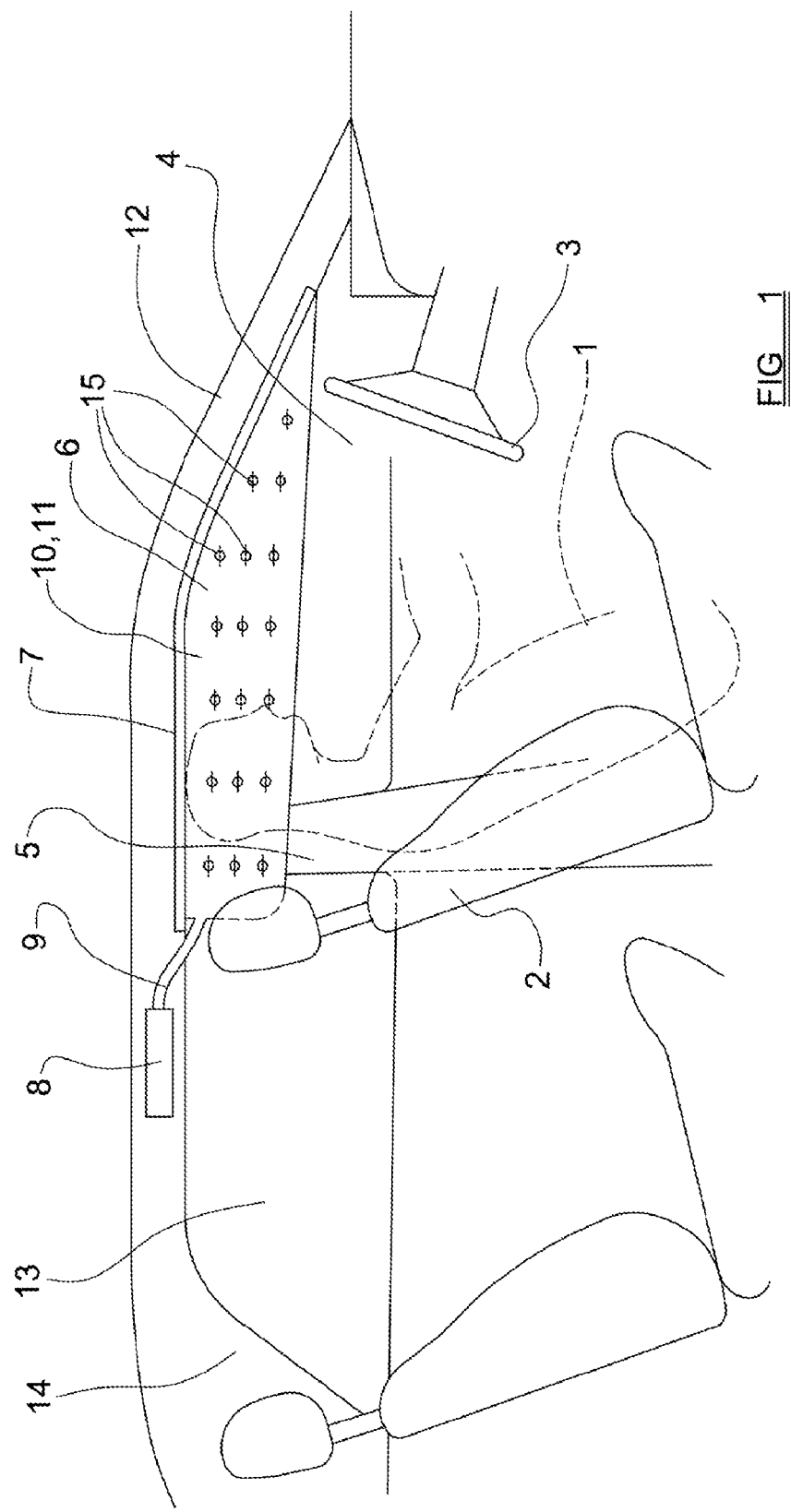
FIG. 1 is a side view of part of the interior of a motor vehicle, illustrating a safety device in accordance with the present invention in an operative position.

Referring initially to FIG. 1 of the accompanying drawings, a safety device is illustrated which is intended to provide protection for an occupant 1 of a front seat 2 in a motor vehicle. In a frontal impact in which the vehicle is caused to decelerate rapidly, the occupant 1 will tend to move forwardly relative to the vehicle towards the steering wheel 3, but will be restrained by a conventional seat-belt and airbag. In the case of a side impact or roll-over incident, however, there is a risk that the head of the occupant 1 will strike the side of the vehicle and in particular the front side window 4, or that the head of the occupant 1 will strike the B-pillar 5 of the vehicle. There is also a risk that if the side window 4 breaks, the head of the occupant 1 may be thrown out of the window aperture, especially in the case of a roll-over incident.

The safety device is shown in FIG. 1 in an operative, deployed condition in which an inflatable element 6 is positioned between the head of the occupant and the side of the vehicle. Prior to deployment of the safety device, the inflatable element 6 is retained in a recess 7 provided in the roof lining of the vehicle.

The safety device comprises the inflatable element 6, a gas generator 8 which is fluidly connected to the inflatable element 6 by a hose or duct 9, and a sensor (not shown) which is configured to sense the occurrence or likely occurrence of a side impact or roll-over situation and which serves to activate the gas generator 8 in order to supply a large volume of inflating gas to the inflatable element 6. The inflatable element 6 is formed from two opposed layers of fabric 10 and 11 which are interwoven at predetermined regions so as to form the periphery of the bag or enclosure constituting the inflatable element. Thus, the inflatable element 6 may be regarded has having a front part and rear part, each being formed from a woven layer of fabric. A technique for making an inflatable element 6 of interwoven fabric is described in more detail in International Patent Publication WO90/09295.

It will be appreciated that the upper edge of the inflatable element 6 is fixed to part of the roof of the vehicle and that it extends, when in the inflated condition as illustrated in FIG. 1, downwardly from the roof line so as to be positioned between the head of the occupant 1 and the side of the vehicle. The inflatable element 6 is relatively thin the lateral direction, that is to say in a direction extending into the plane of the drawing of FIG. 1, and may have a thickness of approximately 30 to 40 mm in that direction.

It will be noted that the inflatable element 6 of the device illustrated in FIG. 1 extends rearwardly from the A-post 12 of the vehicle to a position slightly to the rear of the B-post 5 so that, when in the deployed configuration illustrated in FIG. 1, the safety device affords protection against the head of the front-seat occupant 1 striking the front side window 4 and/or the B-pillar 5. However, it is to be appreciated that embodiments of the invention are also envisaged in which the inflatable element extends rearwardly from the A-pillar 12 past the B-pillar and the rear side window 13 and all the way to the C-pillar 14, in order also to afford protection against the head of a rear seat occupant (not shown) striking the rear side window 13 and/or the C-pillar 14.

In order to prevent the inflatable element 6 from ballooning upon inflation, the two opposed layers of fabric 10 and 11 which form in the inflatable element are interconnected at selected positions 15 by way of tethers formed internally of the inflatable element. The construction of the tethers will be described in more detail below, but it can be seen from the location of the exemplary selected positions 15 illustrated in FIG. 1, that whilst the tethers interconnect the opposed layers of fabric 10 and 11, they do not serve to partition individual cells within the inflatable element. The locations of the tether positions 15 allow the inflatable element 6 to retain an open internal structure whilst still preventing ballooning by defining regions in which the two layers of fabric 10 and 11 are tethered to one another. In an accident situation, such as a side impact, the gas generator 8 is activated and gas from the generator inflates the inflatable element 6, which moves from its initial stored position within the recess 7 to the inflated or operative condition shown in FIG. 1. The open internal structure of the inflatable element 6 provided by the tethers (described in more detail below) at positions 15 permits gas to flow rapidly and easily into all regions of the inflatable element 6, whilst the tethers prevent excessive movement of the two fabric layers 10 and 11 apart from one another which would result in ballooning.

Figure 2:
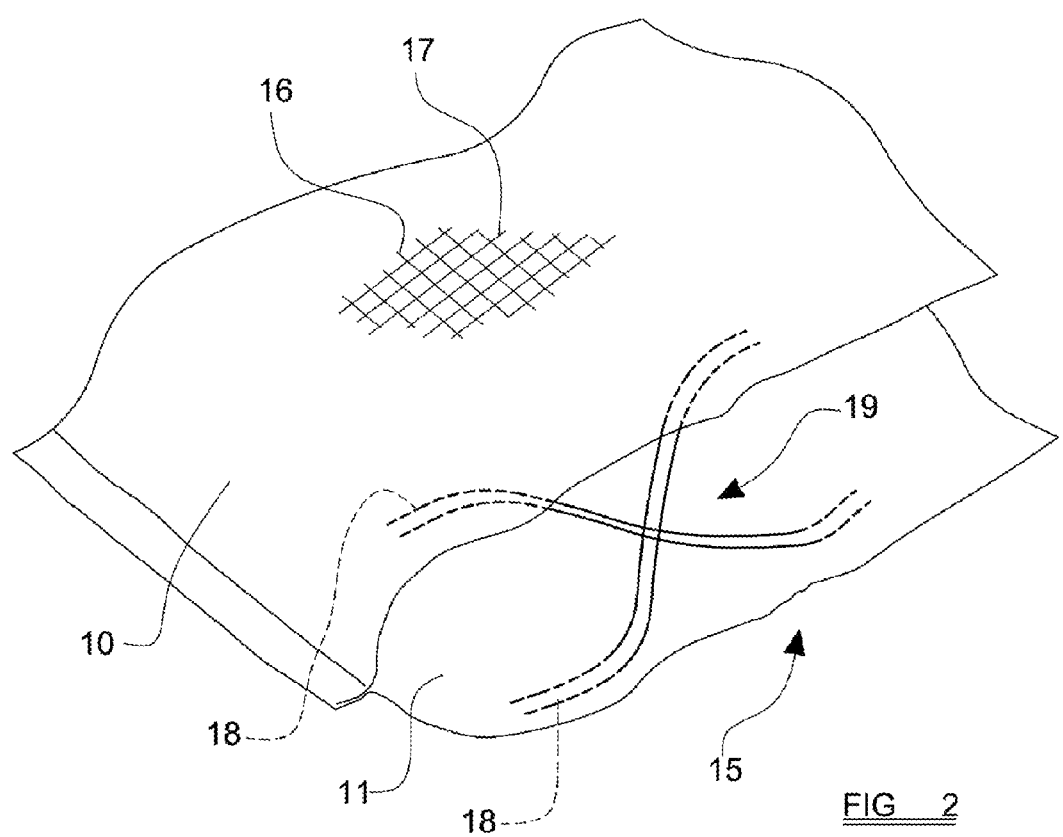
FIG. 2 is a perspective view of a section through part of the inflatable element, showing an internal tether arrangement in accordance with the present invention.
Figure 3:
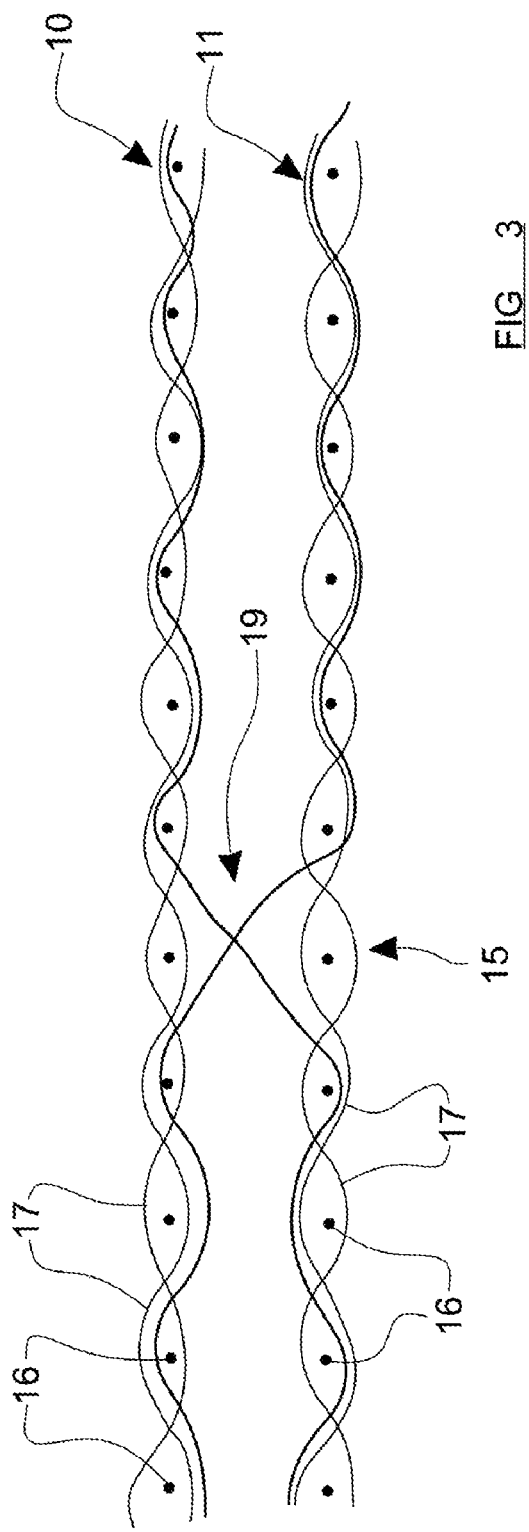
FIG. 3 is a transverse cross-sectional view through part of the inflatable element, in an uninflated condition prior to deployment.

Turning now to consider FIGS. 2 and 3, it will be noted that the two layers of fabric 10 and 11 are each woven from warp yarns 16 and weft yarns 17 in a generally conventional manner. However, at selected positions throughout the layers 10 and 11, additional tether yarns 18 are also woven into the weave of the fabric, as illustrated most clearly in FIG. 3 but also shown schematically in FIG. 2. The tether yarns 18 are woven so as to extend substantially parallel with the weft yarns 17 of the fabric, and pass over and under successive warp yarns 16. The tether yarns 18 have a different construction to the warp and weft yarns 16 and 17 of the fabric layers, as will be described in more detail below.

In the region of the predetermined tether positions 15, the tether yarns 18 pass out of the respective fabric layer 10 and 11 in which they are woven and extend towards the opposing layer 11 and 10. In the particular embodiment illustrated in FIGS. 2 and 3, the tether yarns 18 each actually extend into the opposing fabric layer 11 and 10 and are woven integrally with it. As will thus be noted from FIG. 3, the tether yarns 18 are arranged to cross one another at the tether position 15, passing out of one fabric layer 10, 11 and extending into the other fabric layer 11 and 10. The tether yarns 18 thus cooperate to define a tether 19 which serves to interconnect the two fabric layers 10 and 11 within the inflatable element 6. As illustrated in FIG. 2, each tether 19 may be defined by a plurality of tether yarns 18; in this case two pairs of crossing tether yarns 18. It is also to be noted that the tether 19 represents a somewhat loose collection of tether yarns 18 rather than a group of tightly bound or woven tether yarns.

FIG. 3 illustrates the two fabric layers 10 and 11 located generally adjacent one another, as would be the situation in the uninflated condition of the inflatable element 6. As will be noted, the tether yarns 18 thus cooperate to resist further movement of the two layers 10 and 11 apart from one another.

Figure 4:
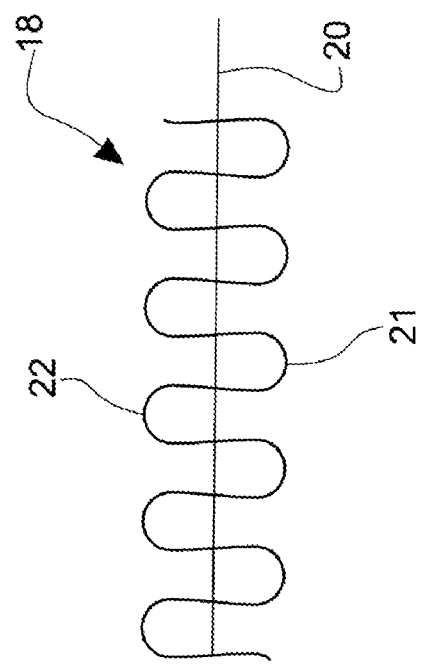
FIG. 4 is a schematic representation of a composite tether yarn in a first condition.

The construction of the tether yarns 18 is an important aspect of the present invention, and will now be described with reference to FIGS. 4 and 5.

Each tether yarn 18 takes the form of a composite yarn comprising a relatively weak core thread 20 over which is provided a relatively strong outer thread 21. More particularly, the core thread 20 is formed as a twisted or textured thread and the outer thread 21 is twisted around and over the core thread 20 in an overfeed manner so as to form a plurality of twists or ravels 22 along the length of the core thread 20. Thus, for any given length of the composite tether yarn 18, the outer thread 21 is substantially longer than the core thread 20, and is initially bunched up along the core thread in twists or ravels 22.

The outer thread 21 is furthermore configured so as to have a higher breaking strength in tension than the core thread 20. More particularly, the outer thread 21 is sufficiently strong not to break during inflation of the inflatable element 6, whilst the core thread is actually configured to break upon the application of tension as the inflatable element 6 is inflated and hence as the two fabric layers 10 and 11 are driven further apart from the initial condition illustrated in FIG. 3.

FIGS. 5 and 6 illustrate the behaviour of the tether yarns 18 during inflation of the inflatable element. Having particular regard to FIG. 6, it can be seen that as the inflatable element increases in lateral thickness under inflation, the two layers 10 and 11 will be driven apart. Initially, movement of the layers 10 and 11 in this way will be resisted by the core threads 20 of the tether yarns, but as inflation continues a point is reached at which the strength of the core threads 20 is overcome by the internal pressure of the inflating gas within the inflatable element. At this point the core threads 20 will break, as illustrated at 23 in FIGS. 5 and 6, whereupon the tether yarns 18 rapidly increase in length as the longer outer threads 21 unravel along the region of the tether yarns extending between the two fabric layers to take up the slack in the tether yarns 18. The longer outer threads 21 will eventually be drawn taut so as to define a limit to the movement of the fabric layers apart from one another, thereby preventing ballooning of the inflatable element 6.

As will be appreciated, the composite construction of the tether yarns 18 makes them extendible in length, thereby preventing the regions of the tether yarns which are woven into the weave of the two fabric layers 10 and 11 from being pulled through the fabric layers, which would result in longitudinal contraction of the fabric layers. The composite tether yarns 18 of the invention thus offer significant advantages over previously proposed "tether weave" arrangements because they allow a reduction in the amount of longitudinal contraction of the inflatable element which occurs as it increases in lateral thickness during inflation.

As will be appreciated, the relative lengths of the core threads 20 and the outer threads 21 are largely dependent upon the actual dimensions and configuration of the inflatable element. However, it is proposed that for inflatable elements provided in the form of so-called "inflatable curtains" for side-impact or roll-over protection, the outer threads 21 will be applied to the core threads 21 with an overfeed (increase in length) of at least 20% (compared with the core threads), and most preferably 25%.

It is also proposed that the difference in strength between the core threads 20 and the outer threads 21 of each tether yarn 18 will be achieved by configuring the outer threads 21 to have a higher linear mass density than the core threads 20. For example, the outer threads 21 preferably have a linear mass density which is at least 4 times that of the core threads. More particularly, it is proposed that the core thread of each tether yarn will have a linear mass density in the range 80-110 detx, whilst the outer thread will have a linear mass density in the range 450-500 detx, and preferably approximately 470 detx.

It is to be appreciated that whilst the invention has been described above with specific reference to an embodiment in which tether yarns 18 are grouped together to define discrete tethers 19 at selected positions 15 within the inflatable element, other arrangements are also possible without departing from the scope of the present invention. For example, it is envisaged that a plurality of tether yarns 18 could be provided, each extending between the two fabric layers 10 and 11 at regularly spaced-apart, or random, or quasi-random positions throughout the inflatable element.

Furthermore, whilst the invention has been described above with particular reference to inflatable elements in the form of so-called "inflatable curtains" arranged for deployment between the head of a vehicle occupant and the side of the vehicle, it is to be noted that the invention could also find application in safety devices comprising other forms of inflatable element. For example, it is envisaged that the present invention could also be provided as part of an inflatable airbag intended for deployment elsewhere in or on a motor vehicle such as a frontal airbag or a knee airbag or the like, or even externally arranged pedestrian protection airbags. The invention is not restricted to so-called inflatable curtain arrangements.

While the above description constitutes the preferred embodiment of the present invention, it will be appreciated that the invention is susceptible modification, variation and change without departing from the proper scope and fair meaning of the accompanying claims.

The invention claimed is:

1. A safety device for a motor vehicle, the device comprising an inflatable element (6) formed from two opposing layers of fabric (10, 11), the two layers of fabric (10, 11) being interconnected at selected positions by a plurality of tether yarns (18) extending between the layers of the inflatable element (6), the tether yarns (18) formed as a composite yarn having an outer thread (21) and a core thread (20), the outer thread (21) being overfed on the core thread (20) and having a higher breaking strength than the core thread (20).

2. A safety device according to claim 1, further comprising wherein the tether yarns (18) are configured such that the outer threads (21) remain substantially intact but the core threads (20) break upon inflation of the inflatable element (6), thereby permitting the outer threads (21) to unravel and thus extend the effective length of the tether yarns (18) between the layers (10, 11).

3. A safety device according to claim 1, further comprising wherein the outer thread (21) of each of the tether yarns (18) is provided over the core thread (20) with an overfeed of at least 10%.

4. A safety device according to claim 1 further comprising wherein the outer thread (21) of each tether yarn (18) is provided over the core thread with an overfeed of approximately 15%.

5. A safety device according to claim 1 further comprising wherein the outer thread (21) of each of the tether yarns (18) is twisted over and around the core thread (20).

6. A safety device according to claim 1 further comprising wherein the outer thread (21) of each of the tether yarns (18) has a linear mass density at least 4 times that of the core thread (20).

7. A safety device according to claim 1 further comprising wherein the core thread (20) of each of the tether yarns (18) has a linear mass density in the range 80-110 detx.

8. A safety device according to claim 1, further comprising wherein the outer thread (21) of each of the tether yarns (18) has a linear mass density in the range 450-1100 detx.

9. A safety device according to claim 1 further comprising wherein the outer thread (21) of each of the tether yarns (18) has a linear mass density of approximately 470 detx.

10. A safety device according to claim 1 further comprising wherein the tether yarns (18) are grouped together so as to collectively define at least one tether (19) interconnecting the layers of fabric (10, 11) at the selected positions and disposed internally within the inflatable element (6).

11. A safety device according to claim 10, further comprising a plurality of the tethers (19) arranged to interconnect the layers of fabric (10, 11) at the selected positions (15).

12. A safety device according to claim 1 further comprising wherein the tether yarns (18) are each woven into the weave of at least one of the layers (10, 11).

13. A safety device according to claim 1 further comprising wherein the tether yarns (18) have a different construction from the warp and weft yarns (16, 17) from which the layers of fabric (10, 11) are predominantly woven.

14. A safety device according to claim 13, further comprising in which the tether yarns (18) are the only composite yarns.

15. A safety device according to claim 1 further comprising the inflatable element (6) is configured to be disposed between an occupant (1) of the vehicle and a side (4) of the vehicle when inflated to afford protection in the event of a side impact or roll-over incident.

\* \* \* \* \*